(12) United States Patent
Zou

(10) Patent No.: US 10,341,268 B2
(45) Date of Patent: Jul. 2, 2019

(54) METHOD AND DEVICE FOR IMPLEMENTING INSTANT MESSAGING

(71) Applicant: BEIJING QIHOO TECHNOLOGY COMPANY LIMITED, Beijing (CN)

(72) Inventor: Tao Zou, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 434 days.

(21) Appl. No.: 15/038,438

(22) PCT Filed: Nov. 19, 2014

(86) PCT No.: PCT/CN2014/091586
§ 371 (c)(1),
(2) Date: May 20, 2016

(87) PCT Pub. No.: WO2015/074555
PCT Pub. Date: May 28, 2015

(65) Prior Publication Data
US 2016/0294738 A1  Oct. 6, 2016

(30) Foreign Application Priority Data
Nov. 22, 2013 (CN) .......................... 2013 1 0597189

(51) Int. Cl.
*G06F 15/16* (2006.01)
*H04L 12/58* (2006.01)

(52) U.S. Cl.
CPC ............ *H04L 51/04* (2013.01); *H04L 51/046* (2013.01)

(58) Field of Classification Search
CPC .............................. H04L 51/04; H04L 51/046
See application file for complete search history.

(56) References Cited

U.S. PATENT DOCUMENTS 6,785,708 B1 * 8/2004 Busey ................... G06Q 30/02
709/204
7,609,911 B2  10/2009 Hasuike
2010/0107088 A1 * 4/2010 Hunt ..................... G06Q 10/10
715/752

(Continued)

FOREIGN PATENT DOCUMENTS

CN  101656616 A  2/2010
CN  102724327 A  10/2012

(Continued)

*Primary Examiner* — John B Walsh
(74) *Attorney, Agent, or Firm* — BakerHostetler

(57) ABSTRACT

Disclosed are a method and device for implementing instant messaging through a browser. A plug-in interface of an instant messaging tool is preset on the browser. The method comprises: a master process of the browser creating a plug-in process corresponding to the instant messaging tool; triggering the plug-in interface to instruct the master process of the browser to reload a browser window; the master process of the browser dividing, in the browser window, page presentation ranges of a plug-in page of the instant messaging tool and a current tab of the browser window and notifying the plug-in process of the page presentation ranges; and the plug-in process generating the plug-in page according to the divided page presentation ranges and loading the plug-in page and the re-rendered current tab side by side in the browser window.

20 Claims, 3 Drawing Sheets

(56) References Cited

U.S. PATENT DOCUMENTS

| | | | |
|---|---|---|---|
| 2011/0161440 A1* | 6/2011 | Juvet | G06F 17/30876 709/206 |
| 2012/0089926 A1* | 4/2012 | Bassemir | H04L 51/046 715/753 |
| 2015/0215261 A1* | 7/2015 | Zhang | G06Q 10/10 709/206 |

FOREIGN PATENT DOCUMENTS

| | | |
|---|---|---|
| CN | 103024010 A | 4/2013 |
| CN | 103257881 A | 8/2013 |
| CN | 103618662 A | 3/2014 |

* cited by examiner

METHOD AND DEVICE FOR IMPLEMENTING INSTANT MESSAGING

CROSS-REFERENCE TO RELATED APPLICATIONS

This application is the national stage of International Application No. PCT/CN2014/091586 filed Nov. 19, 2014, which is based upon and claims priority to Chinese Patent Application No. CN201310597189.2, filed Nov. 22, 2013, the entire contents of which are incorporated herein by reference.

FIELD OF TECHNOLOGY

The disclosure relates to the field of network communication technology and, more particularly, to a method for implementing instant messaging and a device for implementing instant messaging.

BACKGROUND

Instant messaging (IM) software is a kind of software which realizes online chat and communication via instant messaging technology. After users install IM in their terminals respectively, two or more users may use the network to transmit text message, images, voice and geographic position message via the IM window, thereby achieving instant messaging between users. It has the advantages of multi-task operation, having asynchronism, long and short communication, fast medium transforming, being interactive and being not limited by space and time.

When the user uses the IM, he or she usually actives the operation window corresponding to the IM. When the user operates the terminal, the browser and the IM may be operated at the same time. When visiting the browser, the IM window is usually minimized to be displayed in the desktop taskbar as an icon. At that moment, if the user needs to operate the IM, such as receiving friend's message or transmitting files to friends, it is needed to call out the IM window, and close or minimize the window after related operation in the IM window is finished, then continue to access the browser.

As a result, when operating the browser and the IM at the same time, the switching operation between the browser and the IM window is complex, which brings inconvenience to the user. In addition, running browser process and IM process at the same time may affect the operating efficiency and performance.

SUMMARY

In the view of above problems, the disclosure is proposed to provide a method for implementing instant messaging through a browser and a corresponding device for implementing instant messaging through a browser, in order to solve at least part of the above problems.

According to an aspect of the disclosure, there is provided a method for implementing instant messaging through a browser, wherein a plug-in interface of an instant messaging tool is preset on the browser, the method comprises:

a master process of a browser creating a plug-in process corresponding to the instant messaging tool;

triggering the plug-in interface to inform the master process of the browser to reload a browser window;

the master process of the browser dividing page presentation ranges of a plug-in page of the instant messaging tool and a page presentation range of a current tab of the browser window in the browser window, and informing the plug-in process;

the plug-in process generating the plug-in page according to the divided page presentation ranges, and loading the plug-in page and the re-rendered current tab side by side in the browser window.

According to another aspect of the disclosure, there is provided a device for implementing instant messaging through a browser, wherein a plug-in interface of an instant messaging tool is preset on the browser, the device comprises:

a plug-in process creating module, configured for a master process of a browser to create a plug-in process corresponding to the instant messaging tool;

a triggering informing module, configured to trigger the plug-in interface to inform the master process of the browser to reload a browser window;

a range dividing module, configured for the master process of the browser to divide page presentation ranges of a plug-in page of the instant messaging tool and a page presentation range of a current tab of the browser window in the browser window, and to inform the plug-in process;

a page loading module, configured for the plug-in process to generate the plug-in page according to the divided page presentation ranges, and to load the plug-in page and the re-rendered current tab side by side in the browser window.

According to still another aspect of the disclosure, there is provided computer program, comprising computer readable codes, wherein when the computer readable codes are carried out on a terminal device, the terminal device executes the method for implementing the instant messaging through the browser above.

According to still another aspect of the disclosure, there is provided a computer readable medium, having stored computer program above.

According to the embodiment of the disclosure, the master process of the browser creates a plug-in process for managing the instant messaging tool IM, when a preset plug-in interface at the browser is triggered, it is capable to inform the master process of the browser to reload the browser window, the master process of the browser divides ranges which display the plug-in page of the IM and a tab respectively in the browser window, and the plug-in process loads the plug-in page and tab in a browser window according to the divided ranges, thereby allowing the user to operate the IM in the plug-in page, which does not need to switch between the browser and the IM window, simplifies the operation in accessing the IM. In addition, the plug-in process created by the master process of the browser manages the operation of the IM, it is not needed to create new IM process, which avoids much occupation of terminal memory from affecting the operating efficiency and performance of the terminal due to running the browser process and the IM process at the same time.

In addition, according to the embodiment of the disclosure, it is capable to click a preset plug-in function link to transmit the graphics and text information of the webpage in the browser window between IM users, the operation is easy, and the data transmission efficiency is increased.

Described above is merely an overview of the inventive scheme. In order to more apparently understand the technical means of the disclosure to implement in accordance with the contents of specification, and to more readily understand above and other objectives, features and advantages of the disclosure, specific embodiments of the disclosure are provided hereinafter.

BRIEF DESCRIPTION OF THE DRAWINGS

Through reading the detailed description of the following preferred embodiments, various other advantages and benefits will become apparent to an ordinary person skilled in the art. Accompanying drawings are merely included for the purpose of illustrating the preferred embodiments and should not be considered as limiting of the invention. Further, throughout the drawings, same elements are indicated by same reference numbers. In the drawings.

DESCRIPTION OF THE EMBODIMENTS

Exemplary embodiments of the present disclosure will be described in detail with reference to the accompanying figures hereinafter. Although the exemplary embodiments of the disclosure are illustrated in the accompanying figures, it should be understood that the disclosure may be embodied in many different forms and should not be construed as being limited to the embodiments set forth herein. Rather, these embodiments are provided so that this disclosure will be understood thoroughly and completely and will fully convey the scope of the disclosure to those skilled in the art.

The embodiment of the disclosure may be used in a computer system/server, it may be operated together with other various environments or configurations of general purpose computer system or special purpose computer system. The examples of the well-known computing system, environment and/or configuration which is adapted to be used together with the computing system/server may include: a personal computer system, a server computer system, a thin client, a thick client, a handheld or laptop device, a micro-processor based system, a set-top box, a programmable consumer electronics, a network personal computer, a minicomputer system, large-scale computer system and distributed cloud calculating technology environment including the any above systems, and the like.

The computer system/server may be described in general context by computer system executable instructions (such as program modules) executed by computer system. Usually, the program modules may include routines, programs, target programs, components, logics, data structures and so on. They perform specific tasks or realize specific abstract data type. The computer system/server may be implemented in distributed type cloud calculating environment. In the distributed type cloud calculating environment, the tasks are executed by remote processing devices linked by communication network. In distributed type cloud calculating environment, the program modules may be located in storage medium of a local or remote computer system of a storage device.

Figure 1:
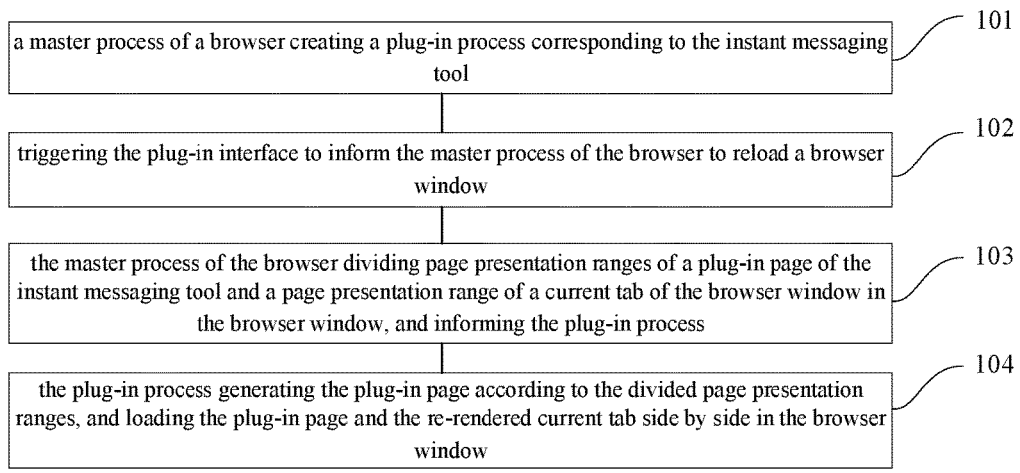
FIG. 1 is a flow chart showing the method for implementing the instant messaging via the browser according to an embodiment of the disclosure.

Referring to FIG. 1, it is a flow chart showing the method for implementing the instant messaging through the browser according to an embodiment of the disclosure. A plug-in interface of an instant messaging tool is preset on the browser, the method may specifically include:

step 101, a master process of a browser creating a plug-in process corresponding to the instant messaging tool;

In an embodiment of the disclosure, an instant messaging tool plug-in in installed in a user terminal, and a plug-in interface corresponds to the plug-in is disposed at the browser. Accessing the plug-in interface may invoke the plug-in of the instant messaging tool. In the embodiment of the disclosure, preferably, when executing the plug-in, the master process of the browser creates the plug-in process corresponding to the instant messaging tool, the step 101 may include:

Sub-step S11, when starting the browser, creating the master process of the browser;

Sub-step S12, the master process of the browser further creating a tab child process and the plug-in process, the plug-in process being a child process of the master process of the browser;

Sub-step S13, the tab child process loading a page of a preset tab at the browser window.

The master process of the browser may create the plug-in process after the browser is started. Specifically, when the browser is started, firstly a master process of the browser is created, since a preset tab (such a blank page or home page) may be displayed when the browser is started, the master process of the browser needs to further create a tab child process for managing the tab.

In the embodiment of the disclosure, at the time of creating the tab child process, a plug-in process for managing the operation of the instant messaging tool plug-in is also created, the plug-in process is the child process of the master process of the browser, it may communicate with the browser process, the plug-in process may be created by corresponding process creating function (CreateReaderActiveXProcess), for example, in Windows operating system, it is capable to create the plug-in process via CreateProcess, in Linux operating system, it is capable to create the plug-in process via fork( ) function.

After the master process of the browser creates the tab child process, the tab child process controls to load the page of the preset tab, specifically, the tab child process initializes a page of the tab that is initializing a WebBrowser control, the WebBrowser is a container encapsulated by Microsoft, it is used to contain a Windows application rendering page, a page is a WebBrowser container, the tab child process invokes the interface of the WebBrowser control to finish the initialization. After the page of the tab is initialized, the page of the tab further obtains the page content of the preset tab, and invokes the browser kernel (such as the chrome kernel) to render the page of the tab, that is, displaying the obtained page content in the initialized page of the tab.

In an embodiment of the disclosure, preferably, after starting the browser, it is capable to only create the plug-in process, and further display the plug-in page or execute the plug-in function when the user invokes the plug-in.

Step 102, triggering the plug-in interface to inform the master process of the browser to reload a browser window.

It is capable to invoke the plug-in of the instant messaging tool via the plug-in interface preset in the browser, and further informs the master process of the browser to reload the current browser window. In an embodiment of the disclosure, preferably, step 102 may include:

Sub-step S21, triggering the plug-in interface, the plug-in interface invoking the plug-in process;

Sub-step S22, the plug-in process informing the master process of the browser to reload the browser window.

It is capable to trigger the plug-in interface at the browser by clicking. The plug-in interface further invokes the plug-in process, the plug-in process informs the master process of the browser it is needed to reload the browser window after the plug-in process is invoked, in order to load the tab and the plug-in page corresponding to the instant messaging tool in the browser window.

Step 103, the master process of the browser dividing page presentation ranges of a plug-in page of the instant messaging tool and a page presentation range of a current tab of the browser window in the browser window, and informing the plug-in process.

In an embodiment of the disclosure, one tab in the currently-opened tab (which may be one or more tabs) is loaded at the position that may previously be used for displaying pages in the browser window, that is, the current tab, after invoking the plug-in interface, it is needed to load the current tab and the plug-in page corresponding to the instant messaging tool at the same time in the browser window, as a result, when the browser receives the information and re-loads the browser window, firstly the page range of the browser window is divided, the area for page display of the browser window is divided into two parts, one part is used to display the current tab, the other part is used to display the plug-in page, the dividing result may inform the plug-in process.

In actual implementation, when dividing the ranges of the current tab and the plug-in page in the browser window, it is capable to divide according to preset ratio, or set ranges for each page. For example, if it is preset that the display area of the plug-in page is the right side of the page, the width is at the ¼ position of the page, the plug-in interface informs the master process of the browser, the master process of the browser further distributes the range of displaying the current tab according to the preset range of the plug-in process.

In an embodiment of the disclosure, preferably, the page presentation range of the plug-in page is the position below a menu bar of the browser window, and the right side of the browser window.

Step 104, the plug-in process generating the plug-in page according to the divided page presentation ranges, and loading the plug-in page and the re-rendered current tab side by side in the browser window.

After the plug-in process receives the page presentation range divided by the master process of the browser, it is capable to load the plug-in page, in the embodiment of the disclosure, step 104 may include:

Sub-step S31, the plug-in process initializing a plug-in page according to the divided page presentation range, the plug-in page invoking a browser kernel to render a page content of the plug-in page;

Sub-step S32, at the same time, the tab child process re-initializing the current tab according to the divided page presentation range, the current tab invoking the browser kernel to re-render the page content of the current tab.

When the plug-in process loads the plug-in page, being similar with the process of loading the sub-tab above, firstly a plug-in page is initialized, the plug-in page further obtains the page content which needs to be displayed and invokes the browser kernel to render the plug-in page, that is displaying the page content in the initialized plug-in page.

At the same time, the tab child process reloads a current tab according to the divided page presentation range, firstly a current period tab is initialized, then the current tab further obtains the page content which needs to be displayed and invokes the browser kernel to render the current tab, that is displaying the obtained page content in the initialized current tab.

According to the embodiment of the disclosure, the plug-in process loads the plug-in page and the tab in a browser window according to the divided ranges, thusly the user may operate the IM in the plug-in page and it is no need to switch between the browser and the IM windows, which simplifies the operation of accessing the IM. In addition, since the plug-in process created by the master process of the browser manages the operation of IM, it is no need to create new IM process, which avoids much occupation of terminal memory from affecting the operating efficiency and performance of the terminal due to running the browser process and the IM process at the same time.

In the embodiment of the disclosure, the browser and the instant messaging tool share a user account or uses different user accounts. When the browser and the IM share a user account, the user may log in the IM at the same time when he or she logs in the browser with the user account of the browser. When the browser and the IM uses different user accounts, after the browser is logged in, the IM account may be binded with the browser account when the IM is logged in for the first time. Then, when the user logs in the browser next time, it is capable to search the IM account binded with the browser account and log in the IM, by which the user does not need to input IM account again, thus the operation is easy and the log-in time is saved.

Figure 2:
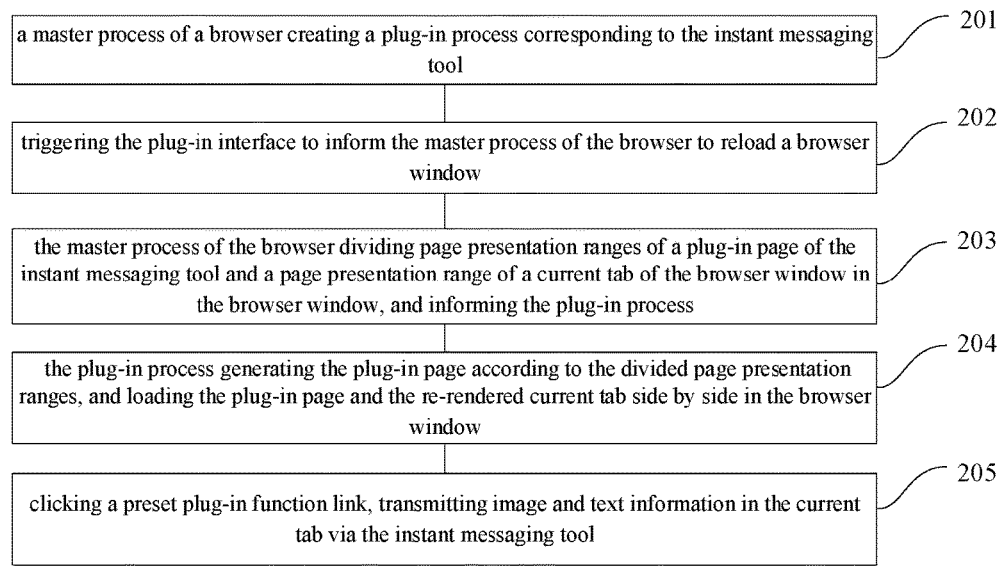
FIG. 2 is a flow chart showing the method for implementing the instant messaging via the browser according to another embodiment of the disclosure.

Referring to FIG. 2, it is a flow chart showing the method for implementing the instant messaging via the browser according to another embodiment of the disclosure, and a plug-in interface of an instant messaging tool is preset on the browser, the method may specifically include:

Step 201, a master process of a browser creating a plug-in process corresponding to the instant messaging tool;

Step 202, triggering the plug-in interface to inform the master process of the browser to reload a browser window;

Step 203, the master process of the browser dividing page presentation ranges of a plug-in page of the instant messaging tool and a page presentation range of a current tab of the browser window in the browser window, and informing the plug-in process;

Step 204, the plug-in process generating the plug-in page according to the divided page presentation ranges, and loading the plug-in page and the re-rendered current tab side by side in the browser window;

Step 205, clicking a preset plug-in function link, transmitting image and text information in the current tab via the instant messaging tool.

After the browser window loads the plug-in page, it is further capable to use the loaded plug-in page to use related functions of the instant messaging software. The difference between the embodiment and the previous embodiment is, in the current embodiment, it is capable to click a plug-in function link corresponding to the preset instant messaging tool, and transmit the graphics and text information selected in the current tab via the instant messaging tool. Preferably, the plug-in function link floats above the graphics and text information of the current tab or is located in a right click menu of a mouse.

Step S205 may further include:

Sub-step S41, selecting the graphics and text information of the current tab and clicking the preset plug-in function link to trigger the tab child process to obtain the graphics and text information;

Sub-step S42, the tab child process transmitting the graphics and text information to the plug-in process, the plug-in process transmitting the graphics and text information to a selected transmission target.

In browsing the graphics and text information of the current tab, if it is needed to transmit the graphics and text information to other user of the instant messaging tool via the instant messaging tool, it is needed to select the graphics and text information that needs to be transmitted, at that moment, the preset plug-in function link may be displayed above the graphics and text information in a floating frame form, by clicking the plug-in function link, the transmission process to the graphics and text information may be triggered immediately. Or, after selecting the graphics and text information that needs to be transmitted, it is capable to click the right button of the mouse, and click the preset plug-in function link from the right-button menu to trigger the transmission process of the graphics and text information.

Clicking the plug-in function link may trigger and control the tab child process of the tab wherein the graphics and text information is located to obtain the graphics and text information, the tab child process and the plug-in process both belongs to the child processes of the master process of the browser, the tab child process transmits the graphics and text information to the plug-in process, the plug-in process further transmits the graphics and text information to the plug-in page it controls.

In an embodiment of the invention, preferably, the sub-step S42 may include:

Sub-step S42-1, after the plug-in process obtains the graphics and text information, re-rendering the plug-in page to be a transmission interface which transmits the graphics and text information, the transmission interface including a plurality of transmission targets;

Sub-step S42-2, according to the submitted transmission targets, selecting at least one transmission target from the transmission targets to transmit the graphics and text information.

The plug-in page of the instant messaging tool may include friend list of the current user and functional buttons for realizing various functions of the instant messaging tool. By selecting friends in the plug-in page, it is capable to communicate with the friends, by clicking the functional buttons, it is capable to invoke various functions of the plug-in.

After the plug-in process obtains the graphics and text information, it is capable to re-render the plug-in page, display the transmission interface which transmits the graphics and text information, the transmission interface may display the to-be-transmitted graphics and text information and a plurality of transmission targets, in the transmission interface, it is capable to select from the transmission targets, for example, the friend list may be displayed in the plug-in page, and it is capable to select a friend in the IM friends.

The user may select one or more transmission target in the plug-in page by clicking, after the plug-in process receives the transmission target selected by the user, the graphics and text information is sent out. Detailedly, the graphics and text information is transmitted from the terminal where the IM is located to the IM server, and then the server sends the graphics and text information to the terminal where the transmission target of the IM is located, thusly achieving transmitting the graphics and text information of the webpage between IM users in the browser window. The operation is simple and the efficiency of data transmission is improved.

According to the embodiment of the disclosure, the master process of the browser creates a plug-in process for managing the instant messaging tool IM, when a preset plug-in interface at the browser is triggered, it is capable to inform the master process of the browser to reload the browser window, the master process of the browser divides ranges which display the plug-in page of the IM and a tab respectively in the browser window, and the plug-in process loads the plug-in page and tab in a browser window according to the divided ranges, thereby allowing the user to operate the IM in the plug-in page, which does not need to switch between the browser and the IM window, simplifies the operation in accessing the IM. In addition, the plug-in process created by the master process of the browser manages the operation of the IM, it is not needed to create new IM process, which avoids much occupation of terminal memory from affecting the operating efficiency and performance of the terminal due to running the browser process and the IM process at the same time.

In addition, according to the embodiment of the disclosure, it is capable to click a preset plug-in function link to transmit the graphics and text information of the webpage in the browser window between IM users, the operation is easy, and the data transmission efficiency is increased.

It should be noted that, to the method embodiments above, in order to describe concisely, the method is represented as an action combination. But the skilled person in the art should understand, the invention is not limited by the described action sequence, because according to the invention, some steps may have other sequences or performed at the same time. In addition, a skilled person in the art also knows, the embodiments described in the specification are preferable embodiments, the related action may not be necessary in the invention.

Figure 3:
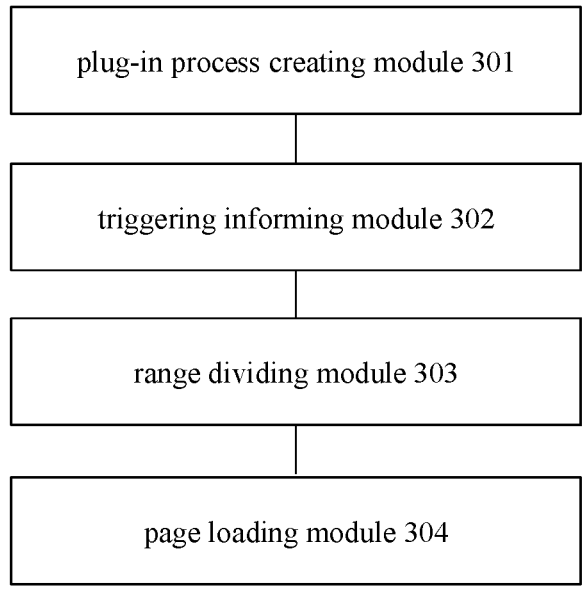
FIG. 3 is a structural diagram showing the device for implementing the instant messaging via the browser according to an embodiment of the disclosure.

Referring to FIG. 3, it is a structural diagram showing the device for implementing the instant messaging via the browser according to an embodiment of the disclosure; the a plug-in interface of an instant messaging tool is preset on the browser, the device may specifically include:

a plug-in process creating module 301, configured for a master process of a browser to create a plug-in process corresponding to the instant messaging tool;

a triggering informing module 302, configured to trigger the plug-in interface to inform the master process of the browser to reload a browser window;

a range dividing module 303, configured for the master process of the browser to divide page presentation ranges of a plug-in page of the instant messaging tool and a page presentation range of a current tab of the browser window in the browser window, and to inform the plug-in process;

a page loading module 304, configured for the plug-in process to generate the plug-in page according to the divided page presentation ranges, and to load the plug-in page and the re-rendered current tab side by side in the browser window.

In an embodiment of the disclosure, preferably, the plug-in process creating module includes:

a master process creating sub-module, configured to create the master process of the browser when the browser is started;

a child process creating sub-module, configured for the master process of the browser to further create a tab child process and the plug-in process, the plug-in process being the child process of the master process of the browser;

a tab loading sub-module, configured for the tab child process to load a page of a preset tab at the browser window.

In an embodiment of the disclosure, preferably, the triggering informing module includes:

a plug-in process invoking sub-module, configured to trigger the plug-in interface, the plug-in interface invoking the plug-in process;

a plug-in process informing sub-module, configured for the plug-in process to inform the master process of the browser to reload the browser window.

In an embodiment of the disclosure, preferably, the page loading module includes:

a plug-in page initializing sub-module, configured for the plug-in process to initialize a plug-in page according to the divided page presentation range, the plug-in page invoking a browser kernel to render a page content of the plug-in process;

a tab initializing sub-module, configured for the tag child process to re-initialize the current tab according to the divided page presentation range, the current tab invoking the browser kernel to re-render the page content of the current tab.

In an embodiment of the disclosure, preferably, the page presentation range of the plug-in page is the position below a menu bar of the browser window and the right side of the browser window.

In an embodiment of the disclosure, preferably, the plug-in process of the instant messaging tool comprises a friend list of a current user and functional buttons for realizing functions of the instant messaging tool.

In an embodiment of the disclosure, preferably, the browser and the instant messaging tool share a user account or uses different user accounts.

According to the embodiment of the disclosure, the master process of the browser creates a plug-in process for managing the instant messaging tool IM, when a preset plug-in interface at the browser is triggered, it is capable to inform the master process of the browser to reload the browser window, the master process of the browser divides ranges which display the plug-in page of the IM and a tab respectively in the browser window, and the plug-in process loads the plug-in page and tab in a browser window according to the divided ranges, thereby allowing the user to operate the IM in the plug-in page, which does not need to switch between the browser and the IM window, simplifies the operation in accessing the IM. In addition, the plug-in process created by the master process of the browser manages the operation of the IM, it is not needed to create new IM process, which avoids much occupation of terminal memory from affecting the operating efficiency and performance of the terminal due to running the browser process and the IM process at the same time.

Figure 4:
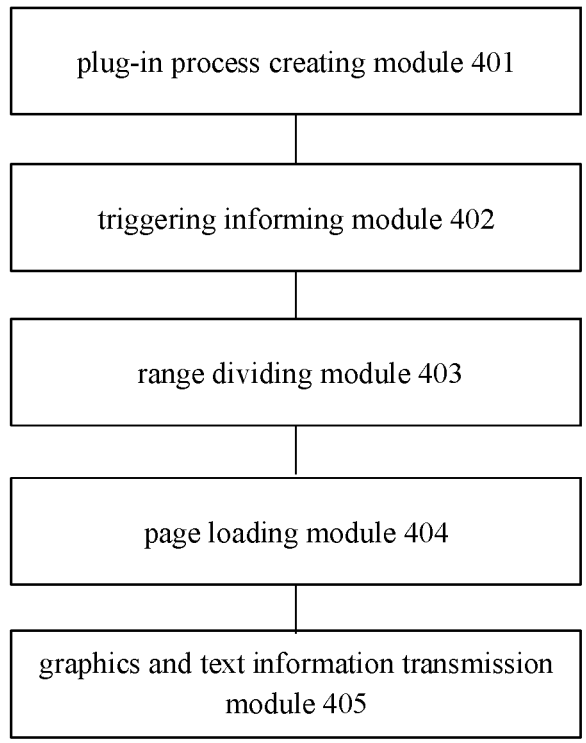
FIG. 4 is a structural diagram showing the device for implementing the instant messaging via the browser according to another embodiment of the disclosure.

Referring to FIG. 4, it is a structural diagram showing the device for implementing the instant messaging via the browser according to another embodiment of the disclosure; a plug-in interface of an instant messaging tool is preset on the browser, the device may include:

a plug-in process creating module 401, configured for a master process of a browser to create a plug-in process corresponding to the instant messaging tool;

a triggering informing module 402, configured to trigger the plug-in interface to inform the master process of the browser to reload a browser window;

a range dividing module 403, configured for the master process of the browser to divide page presentation ranges of a plug-in page of the instant messaging tool and a page presentation range of a current tab of the browser window in the browser window, and to inform the plug-in process;

a page loading module 404, configured for the plug-in process to generate the plug-in page according to the divided page presentation ranges, and to load the plug-in page and the re-rendered current tab side by side in the browser window;

a graphics and text information transmission module 405, configured to click a preset plug-in function link, and transmit graphics and text information in the current tab via the instant messaging tool.

In an embodiment of the disclosure, preferably, the graphics and text information transmission module comprises:

a graphics and text information obtaining sub-module, configured to select the graphics and text information of the current tab and click the preset plug-in function link to trigger the tab child process to obtain the graphics and text information;

a graphics and text information transmission sub-module, configured for the tab child process to transmit the graphics and text information to the plug-in process, the plug-in process transmitting the graphics and text information to a selected transmission target.

In an embodiment of the disclosure, preferably, the plug-in interface transmission sub-module includes:

a transmission interface rendering sub-unit, configured to re-render the plug-in page to be a transmission interface which transmits the graphics and text information after the plug-in process obtains the graphics and text information, the transmission interface including a plurality of transmission targets;

a transmission target selecting sub-unit, configured to select at least one transmission target of the transmission targets to transmit the graphics and text information according to the submitted transmission targets.

In an embodiment of the disclosure, preferably, the plug-in function link is floated above the graphics and text information of the current tab or located in a right click menu of the mouse.

According to the embodiment of the disclosure, the master process of the browser creates a plug-in process for managing the instant messaging tool IM, when a preset plug-in interface at the browser is triggered, it is capable to inform the master process of the browser to reload the browser window, the master process of the browser divides ranges which display the plug-in page of the IM and a tab respectively in the browser window, and the plug-in process loads the plug-in page and tab in a browser window according to the divided ranges, thereby allowing the user to operate the IM in the plug-in page, which does not need to switch between the browser and the IM window, simplifies the operation in accessing the IM. In addition, the plug-in process created by the master process of the browser manages the operation of the IM, it is not needed to create new IM process, which avoids much occupation of terminal memory from affecting the operating efficiency and performance of the terminal due to running the browser process and the IM process at the same time.

In addition, according to the embodiment of the disclosure, it is capable to click a preset plug-in function link to transmit the graphics and text information of the webpage in the browser window between IM users, the operation is easy, and the data transmission efficiency is increased.

The embodiments of device for implementing the instant messaging via the browser described above corresponds to the embodiments of method for implementing the instant messaging via the browser described previously. Therefore, the description is relatively simple, the detailed technical detail may be referred to the illustration of the method embodiments shown in FIG. 1 and FIG. 2 described previously.

The embodiments in the present disclosure are disclosed progressively, each embodiment mainly emphasis the differences from other embodiments, the similar part between different embodiments may be referred to each other.

A skilled person in the art may be easily obtained that, arbitrary combination and application of the above embodiments are available, therefore the embodiment obtained by arbitrary combination of the embodiments are belongs to the scope of the invention, the specification will not describe in detail due to the limitation of length.

Algorithm and display provided herein are not inherently related to a particular computer, virtual system or other equipment. Various general systems may also be used with the teaching based on the disclosure. According to the above description, the required structure for constructing such a system is obvious. In addition, the disclosure is not directed to any particular programming language. It should be understood that a variety of programming languages can be used to implement the disclosed contents as described herein and above description to the particular programming language is to disclose the best inventive implementation mode.

Similarly, it should be understood that, in order to simplify the disclosure and to facilitate the understanding of one or more of various aspects thereof, in the above description of the exemplary embodiments of the disclosure, various features of the disclosure may sometimes be grouped together into a single embodiment, accompanying figure or description thereof. However, the method of this disclosure should not be constructed as follows: the disclosure for which the protection is sought claims more features than those explicitly disclosed in each of claims. More specifically, as reflected in the following claims, the inventive aspect is in that the features therein are less than all features of a single embodiment as disclosed above. Therefore, claims following specific embodiments are definitely incorporated into the specific embodiments, wherein each of claims can be considered as a separate embodiment of the disclosure.

It should be understood by those skilled in the art that modules of the device in the embodiments can be adaptively modified and arranged in one or more devices different from the embodiment. Modules in the embodiment can be combined into one module, unit or component, and also can be divided into more sub-modules, sub-units or sub-components. Except that at least some of features and/or processes or modules are mutually exclusive, various combinations can be used to combine all the features disclosed in specification (including claims, abstract and accompanying figures) and all the processes or units of any methods or devices as disclosed herein. Unless otherwise definitely stated, each of features disclosed in specification (including claims, abstract and accompanying figures) may be taken place with an alternative feature having same, equivalent or similar purpose.

In addition, it should be understood by those skilled in the art, although some embodiments as discussed herein comprise some features included in other embodiment rather than other feature, combination of features in different embodiment means that the combination is within a scope of the disclosure and forms the different embodiment. For example, in the claims, any one of the embodiments for which the protection is sought can be used in any combination manner.

Each of devices according to the embodiments of the disclosure can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the modules in the apparatus according to the embodiments of the disclosure. The disclosure may further be implemented as device program (for example, computer program and computer program product) for executing some or all of the methods as described herein. Such program for implementing the disclosure may be stored in the computer readable medium, or have a form of one or more signals. Such a signal may be downloaded from the internet websites, or be provided in carrier, or be provided in other manners.

Figure 5:
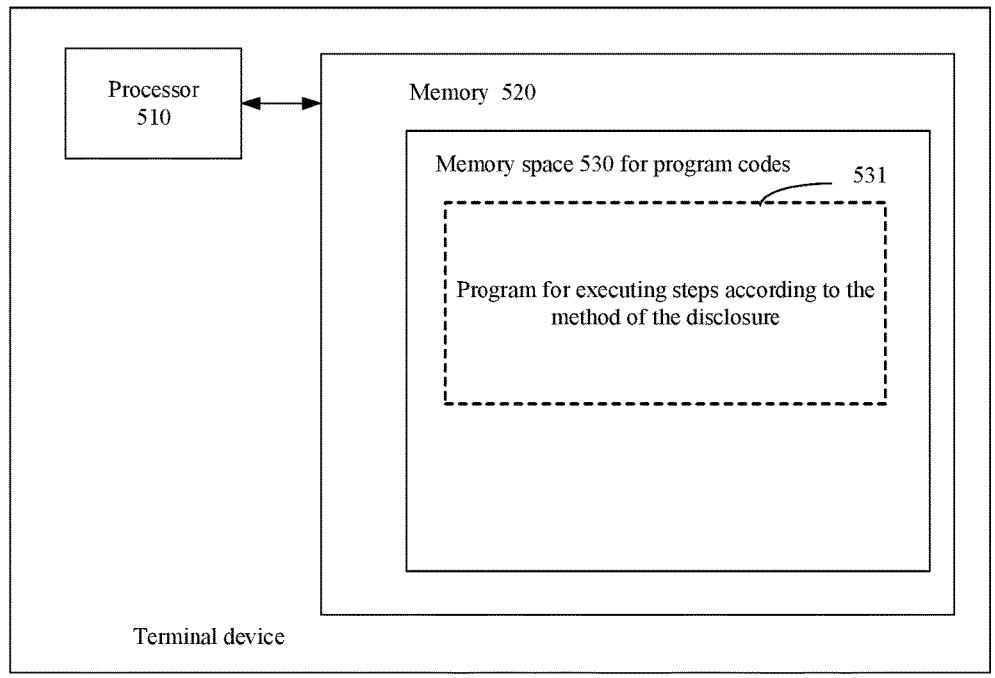
FIG. 5 is a block diagram schematically illustrating a terminal device for executing the method according to the disclosure.
Figure 6:
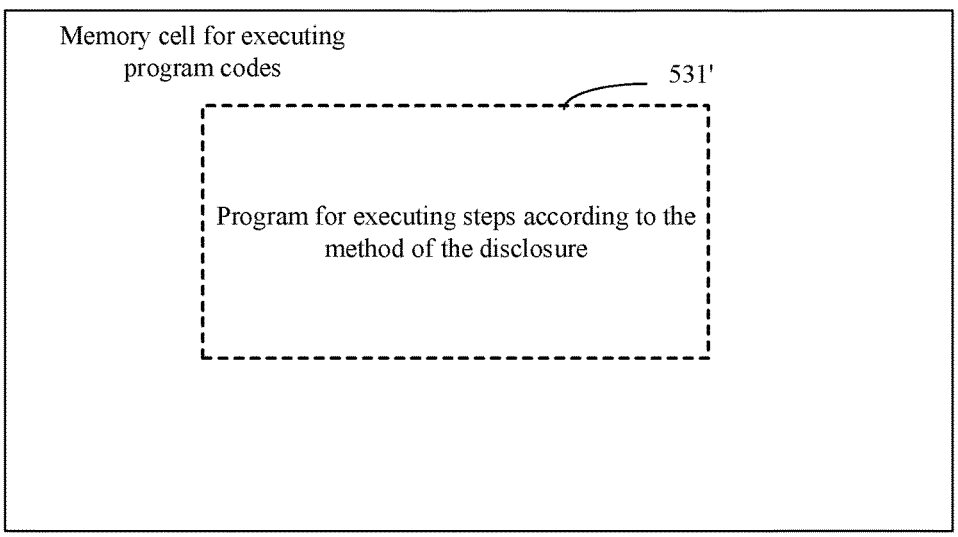
FIG. 6 is a schematically diagram showing a memory unit which is used to store and carry program codes for realizing the method according to the disclosure.

For example, FIG. 5 illustrates a block diagram of a terminal device for executing the method according the disclosure. Traditionally, the terminal device includes a processor 510 and a computer program product or a computer readable medium in form of a memory 520. The memory 520 could be electronic memories such as flash memory, EEPROM (Electrically Erasable Programmable Read-Only Memory), EPROM, hard disk or ROM. The memory 520 has a memory space 530 for executing program codes 531 of any steps in the above methods. For example, the memory space 530 for program codes may include respective program codes 531 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 6. The memory cells may be provided with memory sections, memory spaces, etc., similar to the memory 520 of the terminal as shown in FIG. 5. The program codes may be compressed for example in an appropriate form. Usually, the memory cell includes computer readable codes 531' which can be read for example by processors 510. When these codes are operated on the terminal device, the terminal device may execute respective steps in the method as described above.

The "an embodiment", "embodiments" or "one or more embodiments" mentioned in the disclosure means that the specific features, structures or performances described in combination with the embodiment(s) would be included in at least one embodiment of the disclosure. Moreover, it should be noted that, the wording "in an embodiment" herein may not necessarily refer to the same embodiment.

Many details are discussed in the specification provided herein. However, it should be understood that the embodiments of the disclosure can be implemented without these specific details. In some examples, the well-known methods, structures and technologies are not shown in detail so as to avoid an unclear understanding of the description.

It should be noted that the above-described embodiments are intended to illustrate but not to limit the disclosure, and alternative embodiments can be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed terminal device. In the unit claim listing a plurality of devices, some of these devices may be embodied in the same hardware. The wordings "first", "second", and "third", etc. do not denote any order. These wordings can be interpreted as a name.

Also, it should be noticed that the language used in the present specification is chosen for the purpose of readability and teaching, rather than explaining or defining the subject matter of the disclosure. Therefore, it is obvious for an ordinary skilled person in the art that modifications and variations could be made without departing from the scope and spirit of the claims as appended. For the scope of the disclosure, the publication of the inventive disclosure is illustrative rather than restrictive, and the scope of the disclosure is defined by the appended claims.

What is claimed is:

1. A method for implementing instant messaging through a browser, wherein a plug-in interface of an instant messaging tool is preset on the browser, the method comprises:
    a master process of a browser creating a plug-in process corresponding to the instant messaging tool;
    triggering the plug-in interface to inform the master process of the browser to reload a browser window;
    the master process of the browser dividing page presentation ranges of a plug-in page of the instant messaging tool and a page presentation range of a current tab of the browser window in the browser window, and informing the plug-in process;
    the plug-in process generating the plug-in page according to the divided page presentation ranges, and loading the plug-in page and the re-rendered current tab side by side in the browser window.

2. The method according to claim 1, wherein the master process of the browser creating a plug-in process corresponding to the instant messaging tool comprises:
    creating the master process of the browser when a browser is started;
    the master process of the browser further creating a tab child process and the plug-in process, the plug-in process being a child process of the master process of the browser;
    the tab child process loading a page of a preset tab at the browser window.

3. The method according to claim 1, wherein the step of triggering the plug-in interface to inform the master process of the browser to reload a browser window comprises:
    triggering the plug-in interface, the plug-in interface invoking the plug-in process;
    the plug-in process informing the master process of the browser to reload the browser window.

4. The method according to claim 1, wherein the step of the plug-in process generating the plug-in page according to the divided page presentation range, and loading the plug-in page and the re-rendered current tab in the browser window side by side comprises:
    the plug-in process initializing a plug-in page according to the divided page presentation range, the plug-in page invoking a browser kernel to render a page content of the plug-in page;
    at the same time, the tab child process re-initializing the current tab according to the divided page presentation range, the current tab invoking the browser kernel to re-render the page content of the current tab.

5. The method according to claim 1, wherein the page presentation range of the plug-in page is the position below a menu bar of the browser window and the right side of the browser window.

6. The method according to claim 1, wherein the method further comprises:
    clicking a preset plug-in function link, transmitting graphics and text information in the current tab via the instant messaging tool.

7. The method according to claim 6, wherein the step of clicking the preset plug-in function link, and transmitting the graphics and text information in the current tab via the instant messaging tool comprises:
    selecting the graphics and text information of the current tab and clicking the preset plug-in function link to trigger the tab child process to obtain the graphics and text information;
    the tab child process transmitting the graphics and text information to the plug-in process, the plug-in process transmitting the graphics and text information to a selected transmission target.

8. The method according to claim 7, wherein the step of the plug-in process transmitting the graphics and text information to the selected transmission target comprises:
    after the plug-in process obtains the graphics and text information, re-rendering the plug-in page to be a transmission interface which transmits the graphics and text information, the transmission interface including a plurality of transmission targets;
    selecting at least one transmission target from the transmission targets to transmit the graphics and text information according to the submitted transmission targets.

9. The method according to claim 1, wherein the browser and the instant messaging tool share a user account or uses different user accounts.

10. A terminal device for implementing instant messaging through a browser, wherein a plug-in interface of an instant messaging tool is preset on the browser, the terminal device comprises:
    a memory having instructions stored thereon;
    a processor configured to execute the instructions to perform operations for implementing instant messaging, comprising:
    a master process of a browser creating a plug-in process corresponding to the instant messaging tool;
    triggering the plug-in interface to inform the master process of the browser to reload a browser window;
    the master process of the browser dividing page presentation ranges of a plug-in page of the instant messaging tool and a page presentation range of a current tab of the browser window in the browser window, and informing the plug-in process;
    the plug-in process generating the plug-in page according to the divided page presentation ranges, and loading the plug-in page and the re-rendered current tab side by side in the browser window.

11. The terminal device according to claim 10, wherein the master process of the browser creating a plug-in process corresponding to the instant messaging tool comprises:
    creating the master process of the browser when the browser is started;
    the master process of the browser further creating a tab child process and the plug-in process, the plug-in process being a child process of the master process of the browser;
    the tab child process loading a page of a preset tab at the browser window.

12. The terminal device according to claim 10, wherein the triggering the plug-in interface to inform the master process of the browser to reload a browser window comprises:
   triggering the plug-in interface, the plug-in interface invoking the plug-in process;
   the plug-in process informing the master process of the browser to reload the browser window.

13. The terminal device according to claim 10, wherein the plug-in process generating the plug-in page according to the divided page presentation range, and loading the plug-in page and the re-rendered current tab in the browser window side by side comprises:
   the plug-in process initializing a plug-in page according to the divided page presentation range, the plug-in page invoking a browser kernel to render a page content of the plug-in page;
   at the same time, the tab child process re-initializing the current tab according to the divided page presentation range, the current tab invoking the browser kernel to re-render the page content of the current tab.

14. The terminal device according to claim 10, wherein the page presentation range of the plug-in page is the position below a menu bar of the browser window and the right side of the browser window.

15. The terminal device according to claim 10, wherein the processor is further configured to perform:
   clicking a preset plug-in function link, and transmitting graphics and text information in the current tab via the instant messaging tool.

16. The terminal device according to claim 15, wherein the clicking the preset plug-in function link, and transmitting the graphics and text information in the current tab via the instant messaging tool comprises:
   selecting the graphics and text information of the current tab and clicking the preset plug-in function link to trigger the tab child process to obtain the graphics and text information;
   the tab child process transmitting the graphics and text information to the plug-in process, the plug-in process transmitting the graphics and text information to a selected transmission target.

17. The terminal device according to claim 16, wherein the plug-in process transmitting the graphics and text information to the selected transmission target comprises:
   after the plug-in process obtains the graphics and text information, re-rendering the plug-in page to be a transmission interface which transmits the graphics and text information after the plug-in process obtains the graphics and text information, the transmission interface including a plurality of transmission targets;
   selecting at least one transmission target from the transmission targets to transmit the graphics and text information according to the submitted transmission targets.

18. The terminal device according to claim 15, wherein the plug-in function link floats above the graphics and text information of the current tab or located in a right click menu of a mouse.

19. The terminal device according to claim 10, wherein the browser and the instant messaging tool share a user account or uses different user accounts.

20. A non-transitory computer readable medium, having computer programs stored thereon that, when executed by one or more processors of a terminal device, cause the terminal device to perform:
   a master process of a browser creating a plug-in process corresponding to the instant messaging tool;
   triggering the plug-in interface to inform the master process of the browser to reload a browser window;
   the master process of the browser dividing page presentation ranges of a plug-in page of the instant messaging tool and a page presentation range of a current tab of the browser window in the browser window, and informing the plug-in process;
   the plug-in process generating the plug-in page according to the divided page presentation ranges, and loading the plug-in page and the re-rendered current tab side by side in the browser window.

* * * * *